US012006746B2

(12) United States Patent
Lajewardi et al.

(10) Patent No.: US 12,006,746 B2
(45) Date of Patent: Jun. 11, 2024

(54) ADJUSTABLE GATE LATCH ASSEMBLY

(71) Applicant: THE HILLMAN GROUP, INC., Cincinnati, OH (US)

(72) Inventors: Farhad Lajewardi, Toronto (CA); Ronald Scott Anderson, Toronto (CA)

(73) Assignee: THE HILLMAN GROUP, INC., Forest Park, OH (US)

( * ) Notice: Subject to any disclaimer, the term of this patent is extended or adjusted under 35 U.S.C. 154(b) by 89 days.

(21) Appl. No.: 17/583,622

(22) Filed: Jan. 25, 2022

(65) Prior Publication Data

US 2023/0040016 A1 Feb. 9, 2023

Related U.S. Application Data

(60) Provisional application No. 63/230,998, filed on Aug. 9, 2021.

(51) Int. Cl.
*E05C 3/04* (2006.01)
*E05C 3/00* (2006.01)

(52) U.S. Cl.
CPC .............. *E05C 3/042* (2013.01); *E05C 3/004* (2013.01); *E05C 3/044* (2013.01)

(58) Field of Classification Search
CPC ........... Y10T 292/108; Y10T 292/1063; Y10T 292/1064; E05C 3/042; E05C 3/004; E05C 3/044; E05B 63/04; E05B 63/0056; E05B 65/0007; Y10S 292/29; Y10S 292/60
See application file for complete search history.

(56) References Cited

U.S. PATENT DOCUMENTS

| | | | | | |
|---|---|---|---|---|---|
| 912,295 | A * | 2/1909 | De Voe | E05C 3/042 | 292/202 |
| 1,904,291 | A * | 4/1933 | Neilson | E05B 65/0007 | 292/213 |
| 2,283,304 | A * | 5/1942 | Williams | E05C 3/042 | 292/256.73 |
| 2,772,906 | A * | 12/1956 | Esmond | E05C 3/042 | 292/256.73 |
| 3,043,617 | A * | 7/1962 | Shelton | E05B 65/06 | 292/6 |

(Continued)

FOREIGN PATENT DOCUMENTS

| | | | | |
|---|---|---|---|---|
| DE | 10101639 | A1 * | 7/2002 | E05B 17/005 |
| DE | 102006007691 | B3 * | 6/2007 | E05B 47/0011 |

(Continued)

*Primary Examiner* — Kristina R Fulton
*Assistant Examiner* — Steven A Tullia
(74) *Attorney, Agent, or Firm* — THOMPSON HINE LLP

(57) ABSTRACT

A gate latch assembly includes a first door mountable portion including a first body and carrying a pivotable latch bar that extends outward from a side of the first body, and a first handle part operatively connected to effect pivot of the latch bar when the first handle is rotated, a second door mountable portion including a second body and carrying a pivot bar, and a second handle part operatively connected to effect pivot of the pivot bar when the second handle is rotated. The gate latch assembly can be assembled in either a first configuration to permit rotation of the pivot bar away from its neutral position in only a first direction, or a second configuration to permit rotation of the pivot bar away from its neutral position in only a second direction that is opposite the first direction.

11 Claims, 10 Drawing Sheets

(56) References Cited

U.S. PATENT DOCUMENTS

| | | | | | |
|---|---|---|---|---|---|
| 3,591,219 | A * | 7/1971 | Graziosi | E05C 3/044 292/341.15 |
| 4,083,591 | A * | 4/1978 | Parisien | E05B 65/06 292/202 |
| 4,592,578 | A * | 6/1986 | Martin | E05B 65/06 292/148 |
| 4,655,490 | A * | 4/1987 | Cacicedo | E05B 65/0007 292/205 |
| 4,871,203 | A * | 10/1989 | Rogers | E05C 3/14 292/120 |
| 4,887,854 | A * | 12/1989 | Bulten | E05C 3/14 292/205 |
| 5,265,454 | A * | 11/1993 | Crocco | E05C 3/042 70/101 |
| 5,868,446 | A | 2/1999 | Rossmo | |
| 6,017,068 | A * | 1/2000 | Hughes | E05C 19/009 292/299 |
| 6,752,438 | B2 | 6/2004 | DeSouza | |
| 7,272,963 | B2 | 9/2007 | Rosenberg | |
| 8,678,451 | B2 * | 3/2014 | Martin | E05C 3/14 292/210 |
| 9,109,377 | B1 | 8/2015 | Guttery | |
| 9,416,571 | B1 * | 8/2016 | McConnell | E05C 3/048 |
| 9,951,543 | B1 | 4/2018 | Guttery | |
| 10,344,509 | B2 * | 7/2019 | Bledsoe | E05C 3/16 |
| 10,443,278 | B1 * | 10/2019 | Moody | E05C 3/14 |
| 2005/0173930 | A1 * | 8/2005 | Geisthardt | E05B 65/0007 292/61 |
| 2007/0246951 | A1 * | 10/2007 | Thompson | E05C 3/044 292/210 |
| 2016/0319577 | A1 * | 11/2016 | Liang | E05C 3/14 |
| 2017/0314305 | A1 * | 11/2017 | Beversdorf | E05C 3/044 |
| 2019/0226251 | A1 * | 7/2019 | Crosser | E05C 19/005 |
| 2019/0234112 | A1 * | 8/2019 | Hong | E05B 63/04 |
| 2020/0240176 | A1 * | 7/2020 | Crosser | E05B 7/00 |
| 2022/0396973 | A1 * | 12/2022 | Bach | E05B 53/003 |
| 2023/0074741 | A1 * | 3/2023 | Seykora | E05B 9/02 |

FOREIGN PATENT DOCUMENTS

| | | | | |
|---|---|---|---|---|
| DE | 202010000432 | U1 * | 7/2010 | E05B 17/203 |
| DE | 102013104078 | A1 * | 10/2014 | E05B 63/0056 |
| DE | 202020103687 | U1 * | 8/2020 | E05B 13/005 |
| DE | 102020127112 | A1 * | 4/2022 | E05B 63/04 |
| EP | 2998465 | A1 * | 3/2016 | E05B 3/065 |
| FR | 994323 | A * | 1/1945 | E05B 13/005 |
| FR | 994323 | A * | 11/1951 | E05C 3/044 |
| FR | 2847925 | A1 * | 6/2004 | E05B 3/08 |
| GB | 219433 | A * | 5/1923 | E05B 17/005 |
| GB | 219433 | A * | 7/1924 | E05C 3/044 |
| GB | 305785 | A * | 1/1928 | E05B 53/001 |
| GB | 305785 | A * | 2/1929 | E05C 3/044 |
| KR | 200489649 | Y1 * | 2/2019 | E05C 3/004 |
| KR | 200490338 | Y1 * | 7/2019 | E05C 19/024 |
| KR | 20210138936 | A * | 5/2020 | E05B 17/20 |
| WO | WO-2005017293 | A1 * | 2/2005 | E05B 63/04 |
| WO | WO-2011123478 | A1 * | 10/2011 | E05B 53/001 |

* cited by examiner

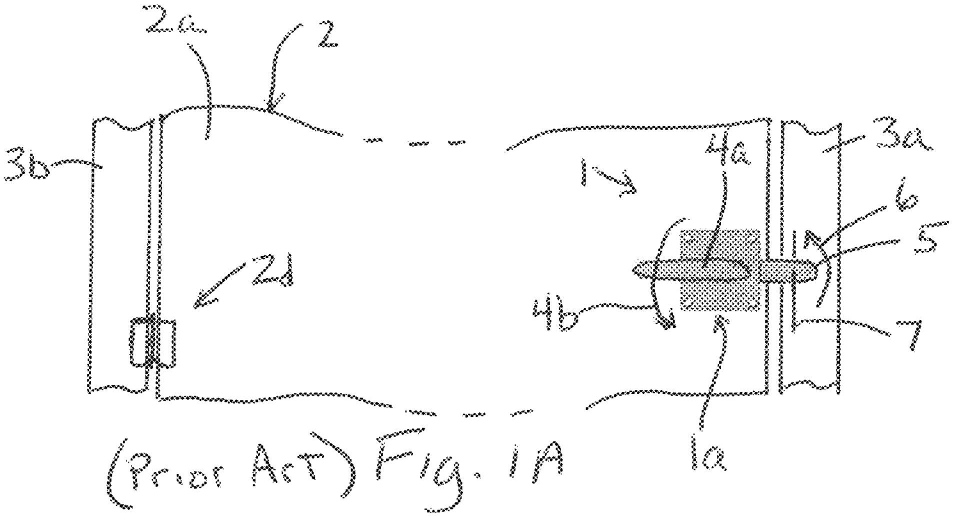
(Prior Art) Fig. 1A
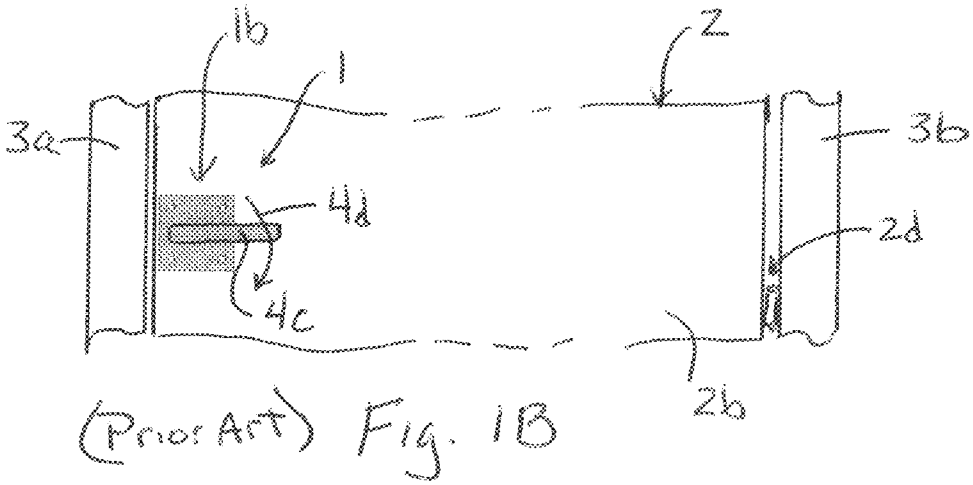
(Prior Art) Fig. 1B

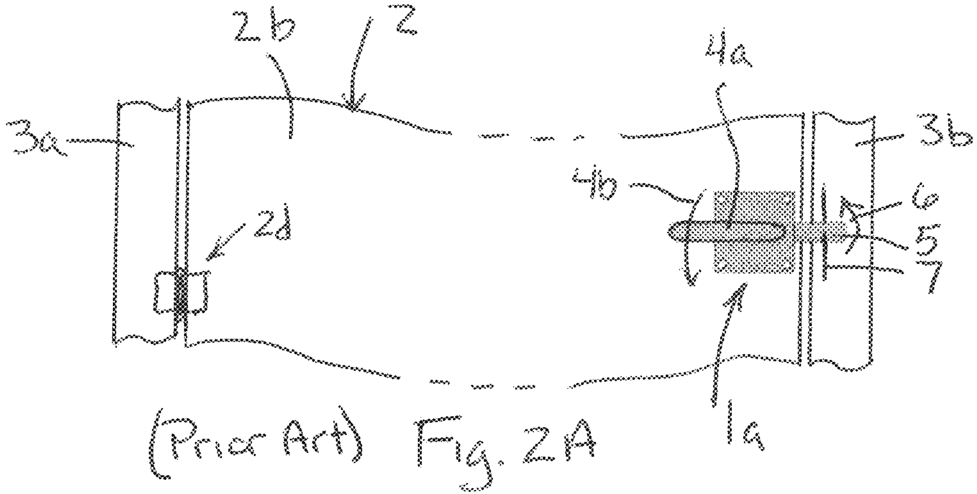
(Prior Art) Fig. 2A
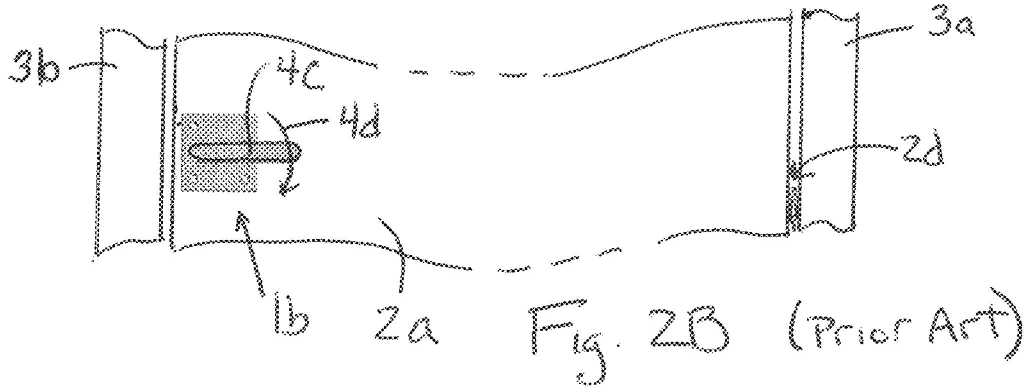
Fig. 2B (Prior Art)

ADJUSTABLE GATE LATCH ASSEMBLY

TECHNICAL FIELD

This application relates generally to gate latches and, in particular, to an adjustable gate latch assembly adapted for use with either left side hinge locations or right side hinge locations.

BACKGROUND

FIGS. 1A and 1B show an exemplary prior art gate latch assembly 1 installed on a door 2, between two posts 3*a* and 3*b*, where rotation of a handle 4*a* in direction 4*b* (or handle 4*c* in direction 4*d*) causes rotation of a latch bar 5 in direction 6. In the illustrated position, door hinges 2*d* would be toward the left side of the image of FIG. 1A and to post 3*b*, with hinge plates mounted on the face 2*a* of the door. The gate latch assembly 1 includes a front part 1*a* mounted on door face 2*a* and which carries the latch bar 5, and a back part 1*b* mounted on door face 2*b*. The latch bar 5 is seated in a slot of a gate latch plate 7 that is mounted to gate post 3*a*. Movement of the latch bar 5 in direction 6 moves the latch bar up out of the slot to enable the door to swing inward in image of FIG. 1A. Notably, such prior art gate latches are only capable of rotation of the latch bar 5 in the single direction 6. Thus, if the hinges are shifted to the right hand side of the door 2, the hinges must be installed at the opposite face 2*b* of the door and the gate latch assembly installed with front part 1*a* on face 2*b* and back part mounted on face 2*a*, per FIGS. 2A and 2B. In this orientation, the door would swing open in a direction to an opposite side of the fence line than that of the FIGS. 1A and 1B. Thus, in the prior art gate latch assembly, the swing open direction is defined by hinge location, and is not selectable. In order to provide user flexibility, manufacturer's provide two different gate latch assemblies (e.g., a right side latch and a left side latch).

It would be desirable to provide a gate latch assembly that provides greater flexibility in terms of swing direction, regardless of whether the door the hinges are located on the right side of the door or left side or the door.

SUMMARY

In one aspect, a gate latch assembly includes a door mountable portion including a body and carrying a pivotable latch bar that extends outward from a side of the body, and a handle part operatively connected to effect pivot of the latch bar when the handle is rotated. The door mountable portion includes a position limiting structure that is selectively positionable in a first location on the body or a second location on the body. When the position limiting structure is in the first location, the position limiting structure prevents the latch bar from pivoting in a first direction while permitting the latch bar to pivot in a second direction that is opposite the first direction. When the position limiting structure is in the second location, the position limiting structure prevents the latch bar from pivoting in the second direction while permitting the latch bar to pivot in the first direction.

In another aspect, a gate latch assembly includes a first door mountable portion including a first body and carrying a pivotable latch bar that extends outward from a side of the first body, and a first handle part operatively connected to effect pivot of the latch bar when the first handle is rotated. A second door mountable portion includes a second body and carrying a pivot bar, and a second handle part operatively connected to effect pivot of the pivot bar when the second handle is rotated. A shaft assembly is provided for interconnecting the first door mountable portion and the second door mountable portion through a hole in a gate door. The gate latch assembly includes one or more position adjustable components for permitting the gate latch assembly to be assembled in either a first configuration or a second configuration. In the first configuration, each of the latch bar and the pivot bar is rotatable away from its neutral position in only a first direction, in the second configuration, each of the latch bar and the pivot bar is rotatable away from its neutral position in only a second direction that is opposite the first direction.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1A-1B and 2A-2B show the two possible installation configurations for a prior art gate latch assembly;

DETAILED DESCRIPTION

Figure 3A:
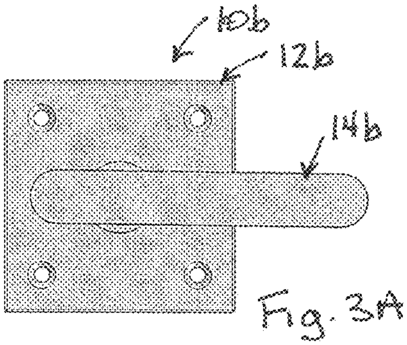
FIGS. 3A-5B show views of one embodiment of the two portions of an adjustable gate latch assembly.
Figure 3B:
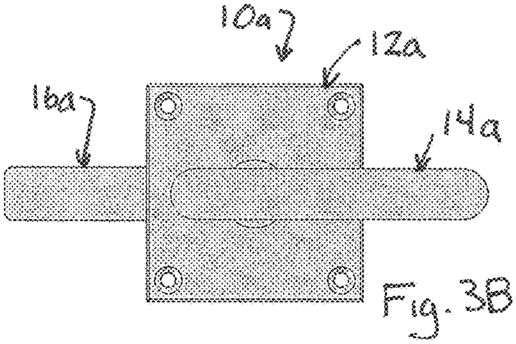

Referring to FIGS. 3A and 3B, two door mountable portions 10*a* and 10*b* of a gate latch assembly are shown in front view (e.g., views from the side that will face away from the door surfaces). Each portion includes a respective body 12*a* and 12*b* with an associated handle 14*a* and 14*b*. Body 12*a* also carries the latch bar 16*a* of the assembly, with the latch bar 16*a* extending outwardly from a side 18*a* of the body 112*a*. As shown, the bodies include openings for receiving listeners to secure each body to respective, opposite faces of a gate door when the assembly is installed for use.

Figure 4A:
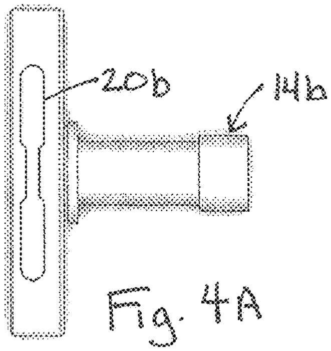
Figure 4B:
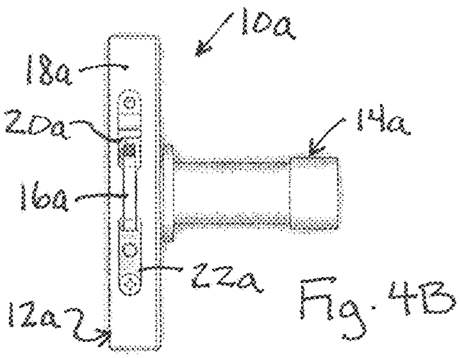
Figure 5A:
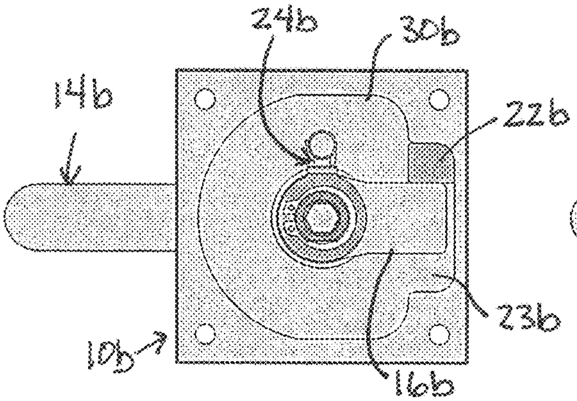
Figure 5B:
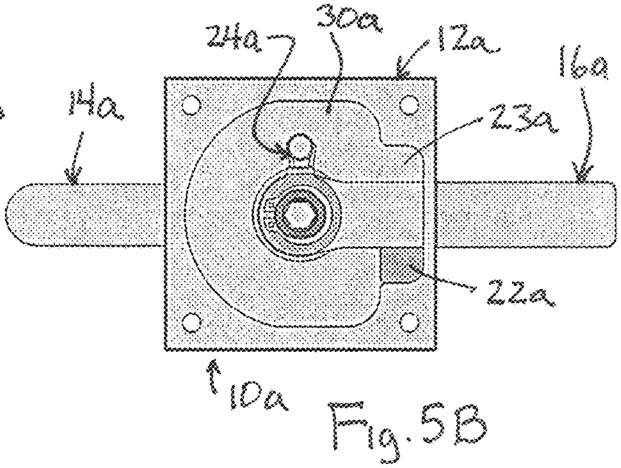

FIGS. 4A and 4B show side views, and FIGS. 5A and 5B show rear views with body recesses 30*a* and 30*b*. Per FIG. 4B, the latch bar slot 20*a* on side 18*a* of the body 12*a* extends both above and below the illustrated neutral position of the latch bar 16*a*. A blocking part 22*a* is located below the latch bar in order to prevent the latch bar from rotating in the downward direction (in the FIG. 5*b* view). Per FIG. 4A, a slot 20*b* on the side of body 12*b* is also provided and the body 12*b* carries a pivot bar 16*b*. A blocking part 22*b* is positioned to prevent the latch bar from rotating in the up direction (in the FIG. 5A view). Notably, when the two portions 10*a* and 10*b* are connected at opposite faces of a door, the blocking parts 22*a* and 22*b* would align with each other at opposite sides of the door, such that the blocking parts 22*a* and 22*b* work in the same manner in terms of limiting latch bar rotation in one direction. Notably, both blockings, parts can be selectively relocated from the illustrated positions of FIGS. 5B and 5A to positions on the opposite side of the latch bar 16*a* and pivot bar 16*b* (e.g., positions 23*a* and 23*b*) to switch the permitted rotation direction of the latch bar 16*a* and pivot bar 16*b* respectively.

In one implementation, each blocking part may be repositioned by removing a fastener that secures the blocking part in place, shifting the blocking part to the other location and securing in place with the same fastener. This could be achieved via access, removal and reposition of the blocking parts from the cavity side of each body or, in some embodiments, via the side slots 20*a* and 20*b*.

Notably, a dual acting spring 24*a* and 24*b* is provided on each portion 10*a* and 10*b* for biasing the latch bar 16*a* (and handle 14*a*) and the pivot bar 16*b* (and handle 14*b*), respectively, into their illustrated neutral positions. The dual acting springs 24*a* and 24*b* provide this function regardless of the position of the blocking parts 22*a* and 22*b*. The dual acting springs also provide this function if the blocking parts 22*a* and 22*b* are removed or left out entirely upon installation.

Figure 7A:
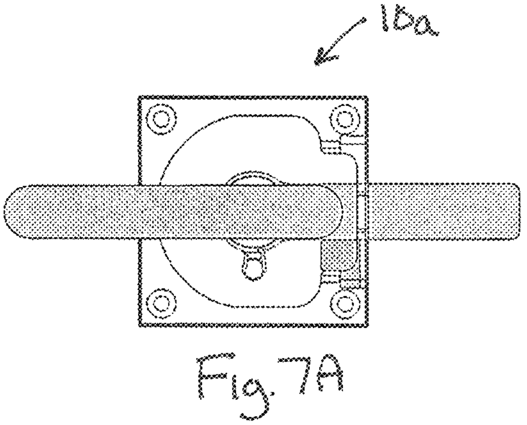
FIGS. 7A-7B show operation of the part of the portion of the adjustable gate latch assembly when in a second configuration.
Figure 7B:
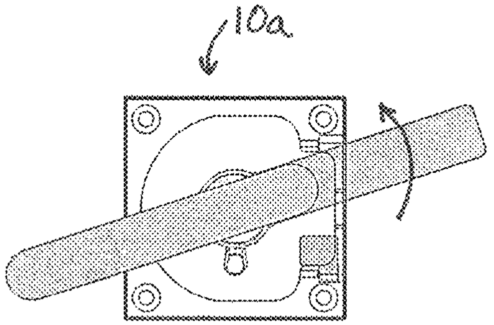
Figure 6A:
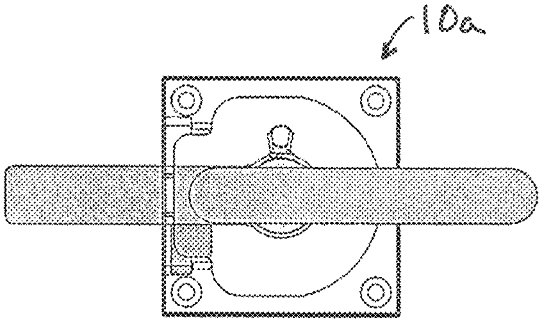
FIGS. 6A-6B show operation of a portion of the adjustable gate latch assembly when in a first configuration.
Figure 6B:
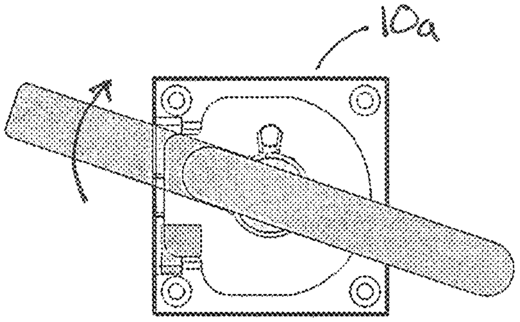
Figure 8A:
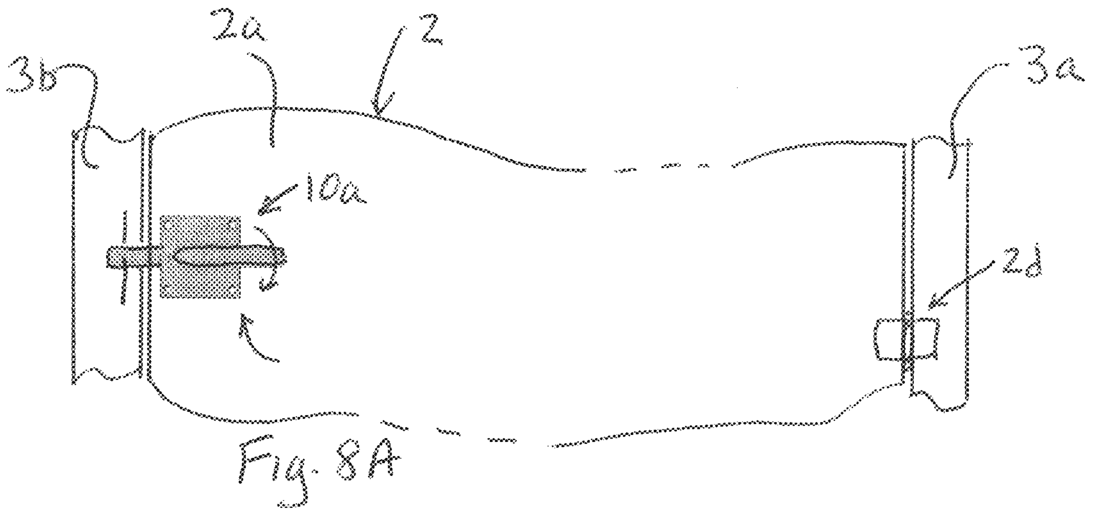
FIGS. 8A-8B and 9A-9B show two additional installation configurations achievable when the adjustable gate latch assembly is in the second configuration.
Figure 8B:
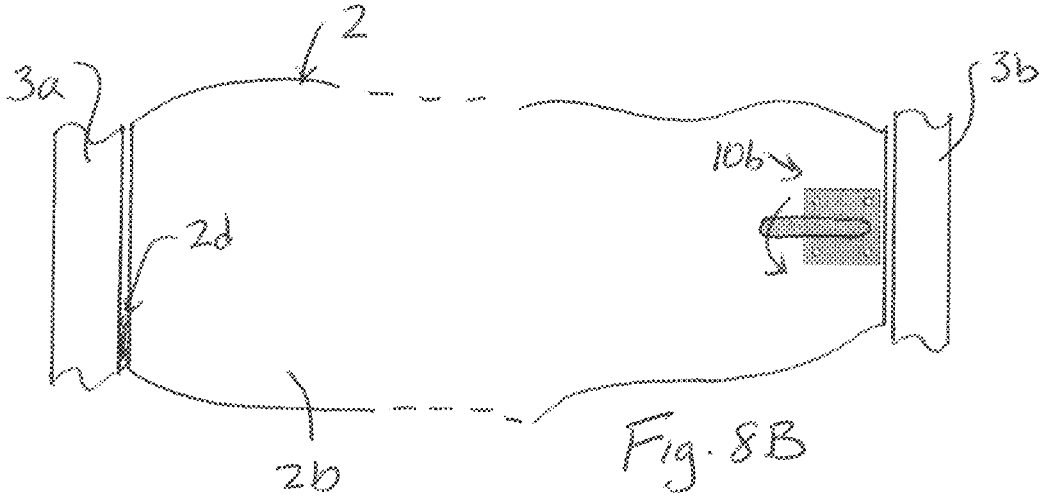
Figure 9A:
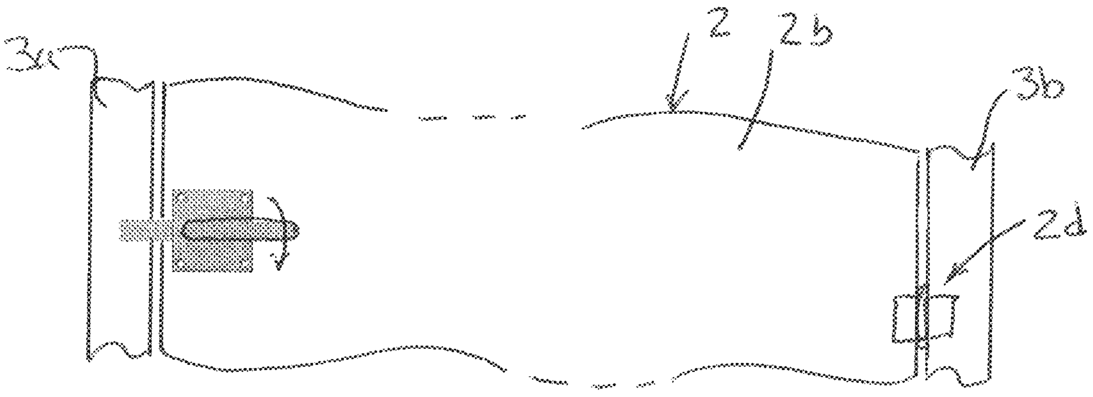
Figure 9B:
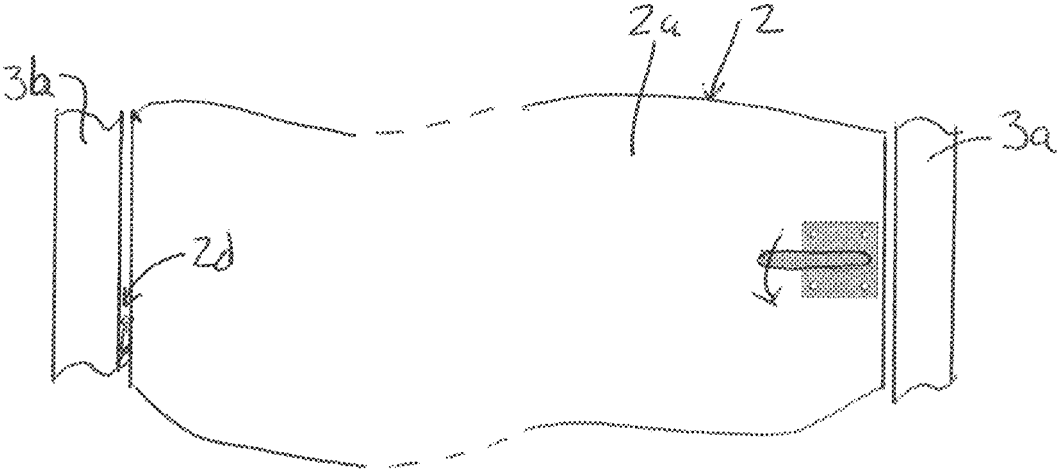

FIGS. 6A and 6B depict operation of portion 10*a* when the blocking part 22*a* is in the position of FIG. 5B. In this orientation portion 10*a* operates similar to the handle gate latch assembly portion 1*a*. FIGS. 7A and 7B depict operation of portion 10*a* when the blocking part 22*a* is switched to position 23*a* of FIG. 6B. Notably, the rotation direction of the latch bar in FIG. 7B is opposite that of the latch bar in FIG. 6B. The FIGS. 7A and 7B orientation provides two additional installation configurations for the inventive gate latch assembly, as compared to the prior art assembly 1. Thus, the inventive latch assembly, when in the orientation of FIGS. 6A and 6B can be mounted to a gate door 2 in either the manner as shown in FIGS. 1A-1B (door swings out of the page in the FIG. 1A view) or the manner shown in FIGS. 2A-2B (door swings out of the page in the FIG. 2A view). In addition, the inventive latch assembly, when in the orientation of FIGS. 7A and 7B, can be mounted to the gate door 2 in either the orientation shown in FIGS. 8A and 8B (door swings out of the page in the FIG. 8A view) or the manner shown in FIGS. 9A and 9B (door swings out of the page in the FIG. 9A view).

Figure 10:
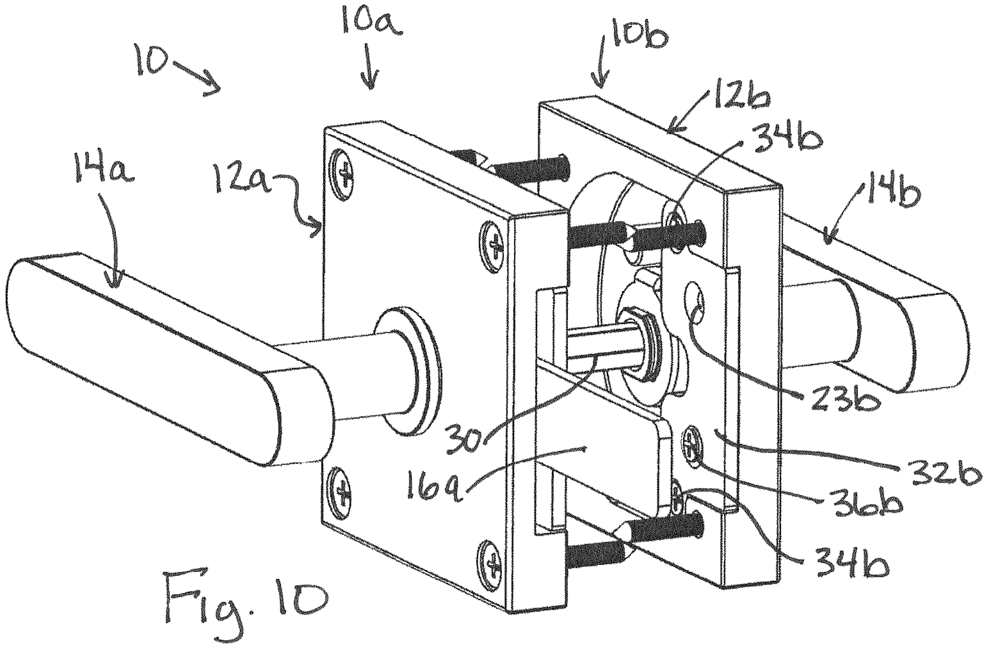
FIGS. 10 and 11 show one detailed embodiment of the adjustable gate latch assembly in the first configuration.
Figure 11:
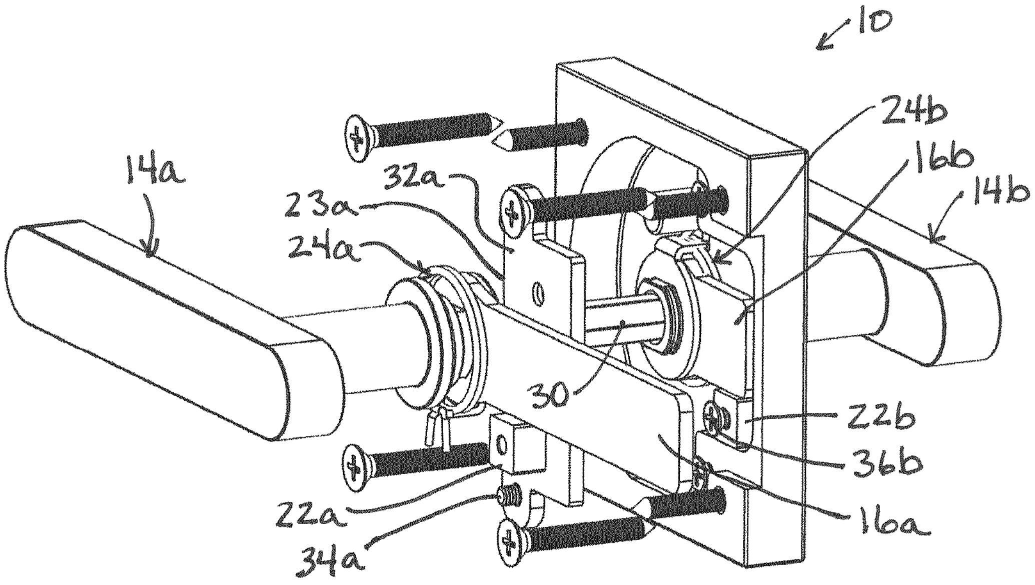
Figure 12:
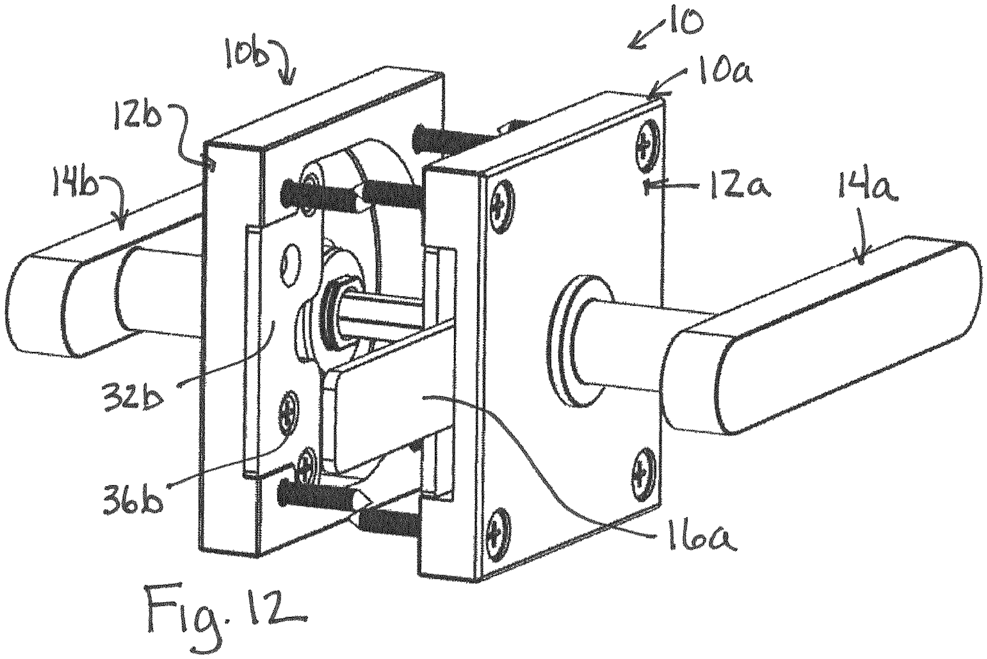
FIGS. 12 and 13 show the detailed embodiment of the adjustable gate latch assembly in the second configuration.
Figure 13:
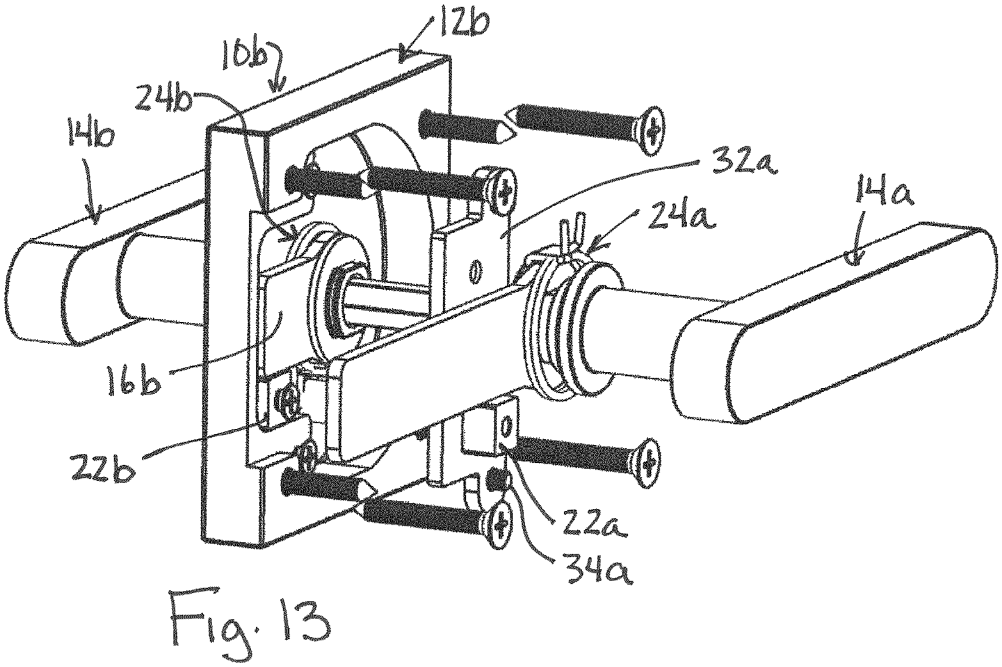
Figure 14:
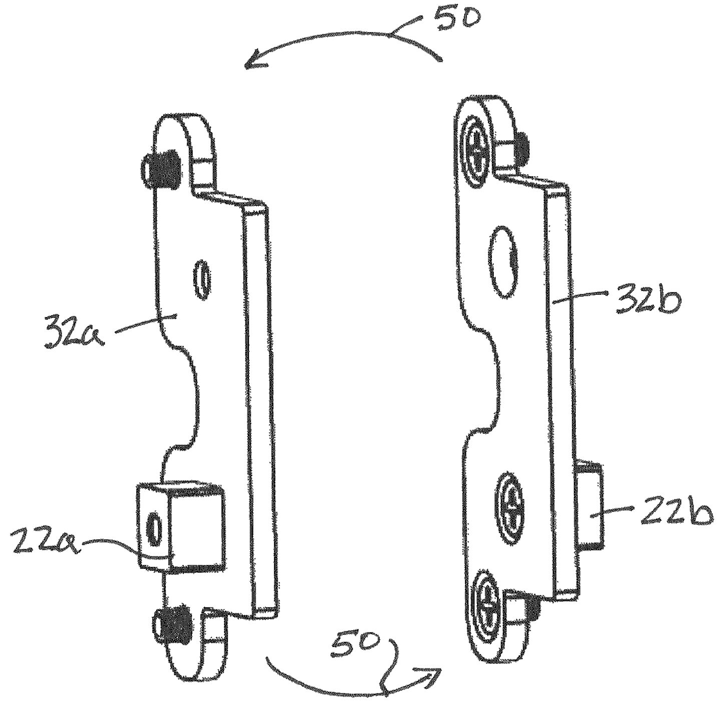
FIGS. 14 and 15 depict possible repositioning of parts of the gate latch assembly.
Figure 15:
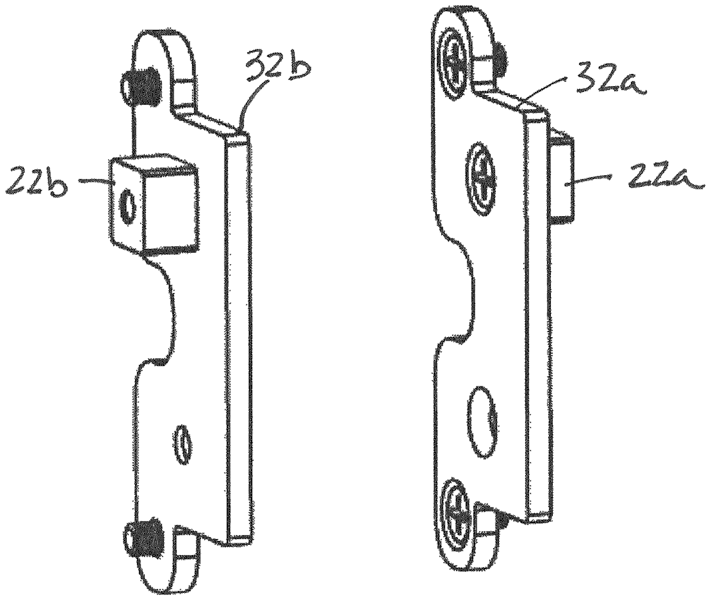

Referring now to FIGS. 10-16, a detailed exemplary configuration of the gate latch assembly 10 is shown. FIGS. 10-11 show the gate latch assembly with door mountable portions 10*a* and 10*b* in the configuration adapted for gate door installations of the type shown in FIGS. 1A-1B and 2A-2B, with the two portions in their respective opposed positions on opposite faces of a door (not shown). The illustrated shaft assembly 30 interconnects the two portions 10*a* and 10*b*, where the shaft assembly would extend through a hole in the gate door to make the interconnection. The shaft assembly 30 causes the two portions to operate together. Thus, rotation of handle 14*a* causes rotation of each of latch bar 16*a*, shaft assembly 30, pivot bar 16*b* and handle 14*b*. Likewise, rotation of handle 14*b* causes rotation of each of pivot bar 16*b*, shaft assembly 30, latch bar 16*a* and handle 14*a*. Here, each blockings, part 22*a* and 22*b* is mounted on a respective bracket 32*a* and 32*b* which is secured to its respective body 10*a* and 10*b* by one or more fasteners 34*a* and 34*b*. The brackets 32*a* and 32*b* span across the latch bar 16*a* and the pivot bar 16*b*, respectively. The blocking parts 22*a* and 22*b* are secured to the respective brackets by fasteners, such as fastener 36*b*.

Notably, each bracket 32*a* and 32*b* includes two respective mount locations for the blocking part, the illustrated position and another position 23*a* and 23*b*. If each blocking part 22*a* and 22*b* is moved to its second position 23*a* and 23*b*, the result is the configuration shown in FIGS. 12-13, which sets up the gate latch assembly 10 for installations of the type shown in FIGS. 8A-8B and 9A-9B. Thus, the gate latch assembly 10 provides a configuration in which a user can, relatively easily, adjust the configuration of the gate latch assembly to match the user's desired installation orientation and corresponding swing direction for a gate door.

In addition to adjustment of the gate latch assembly configuration by repositioning of the blocking parts 22*a* and 22*b* on their respective brackets 32*a* and 32*b*, the configuration can also be adjusted by switching the brackets 32*a* and 32*b* between the two bodies 12*a* and 12. Referencing FIGS. 14 and 15, this adjustment is akin to rotating the position of the brackets 32*a* and 32*b* in the gate latch assembly, per arrows 50, but without rotating the position of any other parts of the gate latch assembly.

Figure 16A:
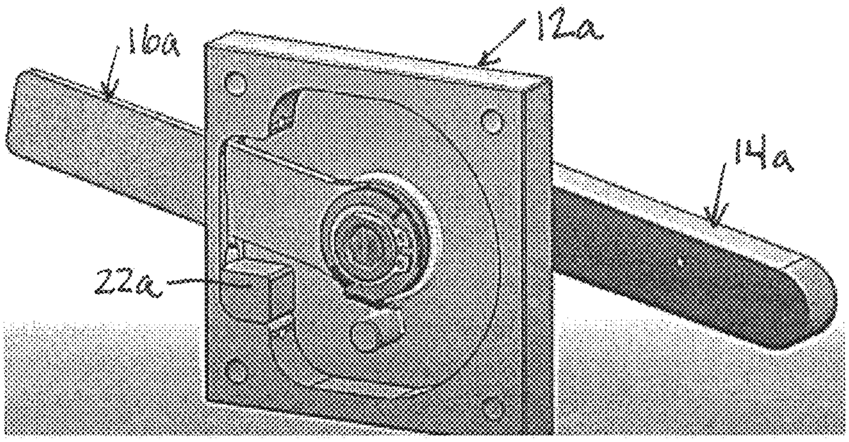
FIGS. 16A-16B show operation of a latch portion in both of its configurations, as viewed from the door Ewing side or back side.
Figure 16B:
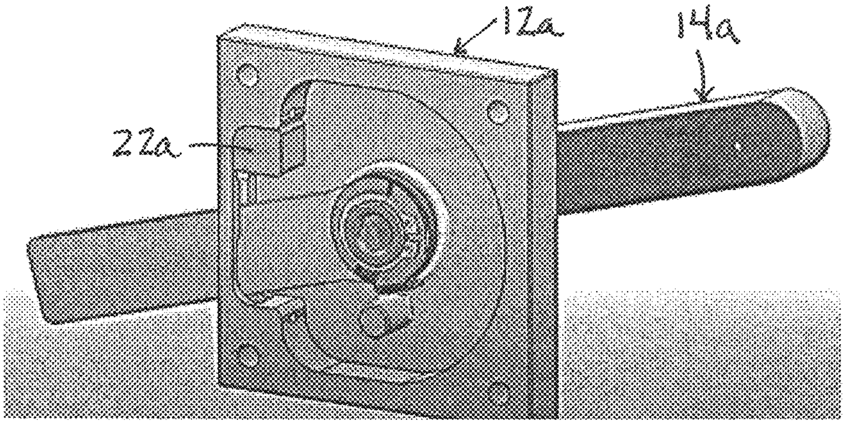

FIGS. 16A-16B show operation of portion 10*a* in both of its configurations, as viewed from the back side or door facing side.

In the inventive gate latch assembly, there is no need to provide both a left side latch assembly and a right side latch assembly. Instead, the adjustable configuration of the inventive latch assembly accommodates both left side installation and right side installation, which can be adjusted per consumer need. In addition, this unique latch design will allow the door to be opened inward or outward with flexibility of the door hinge orientation.

It is to be clearly understood that the above description is intended by way of illustration and example only, is not intended to be taken by way of limitation, and that other changes and modifications are possible. The scope of protection of each following claim shall only be limited by features expressly set forth in such claim.

The invention claimed is:

1. A gate latch assembly, comprising:

a door mountable portion including a body and carrying a pivotable latch bar that extends outward from a side of the body, and a handle part operatively connected to effect pivot of the latch bar when the handle is rotated, wherein the latch bar has a defined install orientation on the body that establishes a neutral position of the latch bar;

wherein the door mountable portion includes a position limiting structure that is selectively movable between a first mount location and a second mount location, relative to the latch bar;

wherein, when the position limiting structure is in the first mount location and the latch bar is in the defined install orientation, the position limiting structure prevents the latch bar from pivoting from the neutral position in a first direction while permitting the latch bar to pivot from the neutral position in a second direction that is opposite the first direction;

wherein, when the position limiting structure is in the second mount location and the latch bar is in the defined install orientation, the position limiting structure prevents the latch bar from pivoting from the neutral position in the second direction while permitting the latch bar to pivot from the neutral position in the first direction;

wherein the gate latch assembly is mounted on a first face of a gate door, wherein the door mountable portion is a first door mountable portion and the position limiting structure is a first position limiting structure, the gate latch assembly further comprising:

a second door mountable portion including a second body and a second handle part operatively connected to effect pivot of the latch bar when the second handle is rotated, wherein the second door mountable portion is mounted on a second face of the gate door in a position opposed to the first portion;

wherein the second door mountable portion includes a second position limiting structure that is selectively movable between a third mount location and a fourth mount location, relative to the latch bar;

wherein, when the second position limiting structure is in the third mount location and the latch bar is in the defined install orientation, the second position limiting structure prevents the latch bar from pivoting from the neutral position in the first direction while permitting the latch bar to pivot from the neutral position in the second direction;

wherein, when the second position limiting structure is in the fourth mount location and the latch bar is in the defined install orientation, the second position limiting structure prevents the latch bar from pivoting from the neutral position in the second direction while permitting the latch bar to pivot from the neutral position in the first direction.

2. The gate latch assembly of claim 1, wherein the first position limiting structure comprises a movable blocking part that is separate from the latch bar and movable independently of the latch bar, wherein the movable blocking part is positioned on a first side of the latch bar when the first position limiting structure is in the first mount location, wherein the movable blocking part is positioned on a second side of the latch bar when the first position limiting structure is in the second mount location.

3. The gate latch assembly of claim 2, further comprising a bracket spanning across a width of the latch bar, wherein the blocking part is attachable to the bracket at a first position, corresponding to the first mount location, and at a second position, corresponding to the second mount location.

4. The gate latch assembly of claim 1, further comprising a double acting spring operatively connected to bias the latch bar into the neutral position, both when the first position limiting structure is in the first mount location and when the first position limiting structure is in the second mount location.

5. A gate latch assembly, comprising:

a first door mountable portion including a first body and carrying a pivotable latch bar that extends outward from a side of the first body, and a first handle part operatively connected to effect pivot of the latch bar when the first handle is rotated;

a second door mountable portion including a second body and carrying a pivot bar, and a second handle part operatively connected to effect pivot of the pivot bar when the second handle is rotated;

a shaft assembly for interconnecting the first door mountable portion and the second door mountable portion through a hole in a gate door;

wherein the gate latch assembly includes at least one position adjustable component for permitting the gate latch assembly to be assembled in either a first configuration or a second configuration, wherein, in the first configuration, the latch bar is in a set position and orientation and each of the latch bar and the pivot bar is rotatable away from its neutral position in only a first direction, wherein, in the second configuration, the latch bar is in the set position and orientation and each of the latch bar and the pivot bar is rotatable away from its neutral position in only a second direction that is opposite the first direction.

6. A gate latch assembly, comprising:

a door mountable portion including a body and carrying a pivotable latch bar that extends outward from a side of the body, and a handle part operatively connected to effect pivot of the latch bar when the handle is rotated, wherein the body includes a door facing side with a recessed region;

wherein the door mountable portion includes a position limiting structure that is selectively positionable, independently of the latch bar, in a first stationary mount location within the recessed region or a second stationary mount location within the recessed region;

wherein, when the position limiting structure is in the first stationary mount location, the position limiting structure prevents the latch bar from pivoting from a neutral position in a first direction while permitting the latch bar to pivot from the neutral position in a second direction that is opposite the first direction, so as to configure the door mountable portion for mounting and operation at a left side of a gate door;

wherein, when the position limiting structure is in the second stationary mount location, the position limiting structure prevents the latch bar from pivoting from the neutral position in the second direction while permitting the latch bar to pivot from the neutral position in the first direction, so as to configure the door mountable portion for mounting and operation at a right side of a gate door.

7. The gate latch assembly of claim 6, wherein the position limiting structure is at least one blocking component, and the first stationary mount location is a location in which the at least one blocking component is fixed above an upper edge portion of the latch bar.

8. The gate latch assembly of claim 7, wherein the second stationary mount location is a location in which the at least one blocking component is below a lower edge portion of the latch bar.

9. The gate latch assembly of claim 6, wherein the position limiting structure comprises a first blocking component located on a first bracket and a second blocking component located on a second bracket, wherein:

the first bracket is located in a first position on the gate latch assembly and the second bracket is located in a second position on the gate latch assembly, such that the position limiting structure is in the first stationary mount location;

the first bracket is located in the second position on the gate latch assembly and the second bracket is located in first position on the gate latch assembly, such that the position limiting structure is in the second stationary mount location.

10. The gate latch assembly of claim 1, wherein the first position limiting structure is at least one blocking component, the first mount location is a location in which the at least one blocking component is fixed above an upper edge portion of the latch bar.

11. The gate latch assembly of claim 10, wherein the second mount location is a location in which the at least one blocking component is below a lower edge portion of the latch bar.

* * * * *